Dec. 28, 1926.                                                    1,612,364
J. ELY
INDICATING INSTRUMENT
Filed Jan. 27, 1926
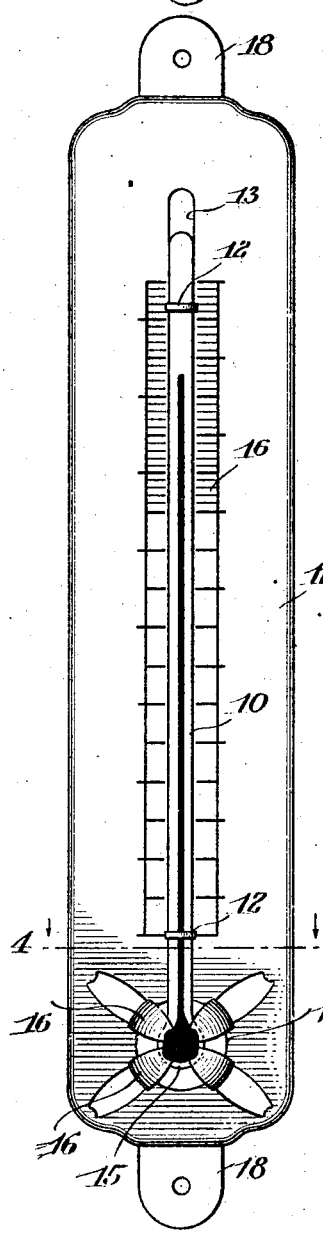
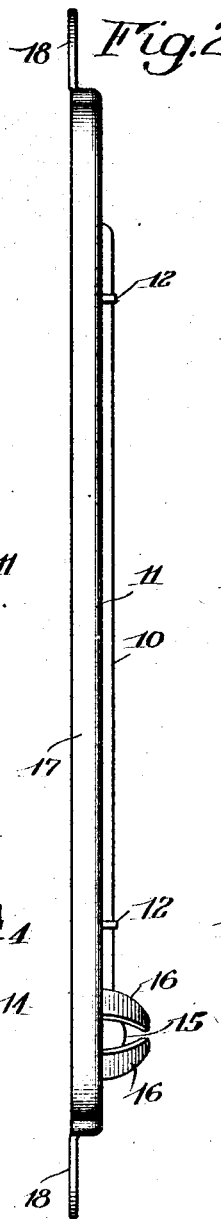
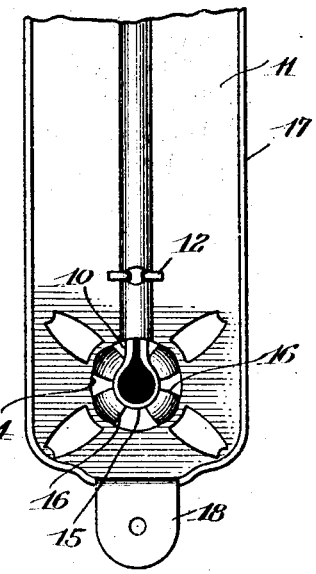
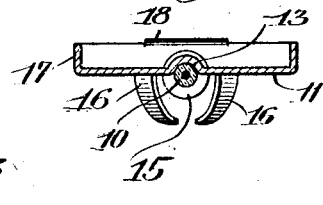
INVENTOR.
James Ely
BY
his ATTORNEYS Patented Dec. 28, 1926.

1,612,364

UNITED STATES PATENT OFFICE.

JAMES ELY, OF ROCHESTER, NEW YORK, ASSIGNOR TO TAYLOR INSTRUMENT COMPANIES, OF ROCHESTER, NEW YORK, A CORPORATION OF NEW YORK.

INDICATING INSTRUMENT.

Application filed January 27, 1926. Serial No. 84,028.

This invention relates to indicating instruments, and particularly to the type utilizing a tube of fragile material having a reservoir bulb.

An object of the invention is to provide an improved indicating instrument with which the bulb will be protected or shielded from injury by blows or knocks; with which the support and shield for the tube and bulb may be made of a single piece of stamped and drawn sheet metal; and which will be attractive in appearance, simple, and relatively inexpensive.

Various other objects and advantages will be apparent from the following description of an embodiment of the invention, and the novel features will be particularly pointed out hereinafter in claims.

In the accompanying drawing:

Figure 1 is a front elevation of a thermometer constructed in accordance with the invention;

Figure 2 is a side elevation of the same;

Figure 3 is a rear elevation of the lower part of the same; and

Figure 4 is a sectional plan of the same, with the section taken approximately along the line 4—4 of Fig. 1.

In the illustrated embodiment of the invention, a thermometer tube 10 is secured against the face of a suitable base 11, in any suitable manner such as by clips or strips 12, each of which passes over the tube, through an aperture in the base, and then is clinched against the rear face of the base. The base is of sheet material such as sheet metal, and may have in its face an elongated depression 13 extending from an aperture 14 in and adjacent one end of the base. The tube is mounted with its bulb 15 in the aperture 14, and with the stem of the tube extending in said depression 13. The face of the base may be provided with suitable scale indications 16 which cooperate with the end of the column of liquid in the tube stem in order to indicate the temperature.

The tube and its bulb are usually of fragile material such as glass, and it is desirable to protect the same, particularly the bulb thereof, against injury from blows or knocks. Accordingly, the base is provided, adjacent to the aperture 14 in which the bulb 15 is disposed, with a plurality of tongues 16 struck out therefrom and bent over the aperture 14 in spaced relation to the bulb, so as to act as a resilient shield therefor. Such tongues may be struck out from the material of the base in a radial arrangement about the aperture 14, the bases of the tongues being provided preferably adjacent to and spaced from the aperture a distance such that the tongues will not easily be broken from the material of the base.

The base may have a rearwardly extending peripheral flange 17 which spaces the body of the base from the wall or surface against which it is disposed sufficiently to protect the bulb against injury from the rear. The tongues as arranged over the aperture 14 will protect the bulb from injury from the front, the free ends of the tongues acting as resilient prongs to absorb any blows which might otherwise reach the bulb of the tube were the prongs not provided. The bulb will be visible for inspection between the tongues, and the spaces between the tongues permits free circulation of air about the bulb. The tongues may be arranged about the aperture 14 so as to produce a pleasing and attractive appearance. The base may also have integral lugs 18 by which it may be secured to a suitable support.

It will be obvious that various changes in the details, which have been herein described and illustrated in order to explain the nature of the invention, may be made by those skilled in the art within the principle and scope of the invention, as expressed in the appended claims.

I claim:

1. An indicating instrument comprising a base of sheet metal, and an instrument tube of fragile material secured against a face of said base and having a liquid supply bulb, said base having a plurality of tongues struck out from the interior of the metal surrounding the bulb and radiating therefrom, with the bases of the tongues nearest the bulb, said tongues being bent over in spaced relation to a face of the base and in protecting relation to said bulb.

2. An indicating instrument comprising a base of sheet metal, and an instrument tube of fragile material secured against a face of said base and having a liquid supply bulb, said base having an aperture surrounding said bulb, and also having a plurality of guard tongues struck out from the metal surrounding the bulb, the tongues radiating from the aperture with their bases nearest the aperture but spaced somewhat therefrom and being bent over said aperture in spaced relation to a face of the base and in protecting relation to said bulb.

JAMES ELY.